Feb. 1, 1955 — O. H. SCHUCK — 2,701,111
CRUISE CONTROL APPARATUS
Filed Sept. 22, 1951 — 2 Sheets-Sheet 1

INVENTOR.
OSCAR HUGO SCHUCK
BY George H. Fisher
ATTORNEY

United States Patent Office 2,701,111
Patented Feb. 1, 1955

2,701,111

CRUISE CONTROL APPARATUS

Oscar Hugo Schuck, Minneapolis, Minn., assignor to Minneapolis-Honeywell Regulator Company, Minneapolis, Minn., a corporation of Delaware Application September 22, 1951, Serial No. 247,832

11 Claims. (Cl. 244—77)

This invention relates to the field of aircraft control apparatus, and has for its principal purpose to provide means for controlling the operation of an aircraft so that it has a maximum cruising range.

It is an object of the invention to provide means for simultaneously controlling the pitch attitude and effective power of an aircraft to cause it to proceed at the altitude and attack angle which together result in maximum range for the craft.

Another object of the invention is to provide means for modifying the operation of pitch attitude and effective power control means in a craft in accordance with the gross weight of the craft.

A still further object of the invention is to provide means for determining the gross weight of an aircraft from its characteristics in flight.

Yet another object of the invention is to provide means for computing the gross weight of an aircraft in accordance with the responses of sensors for its airspeed and its attack angle.

Various other objects, advantages, and features of novelty which characterize the invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which the invention is illustrated and described. In the drawing:

It has long been recognized as desirable to operate aircraft in such conditions of flight as will give maximum range for a given amount of fuel consumption. This is advantageous not only in reducing the cost of the fuel itself, but also, by decreasing the amount of fuel required at the take-off, in increasing the ratio of pay load to fuel load and hence the return to be expected from operation of the craft. Of course, there are also occasions when it is decidedly advantageous to be able to complete a long flight without refueling or with a minimum number of stops for refueling.

Figures 2, 4:
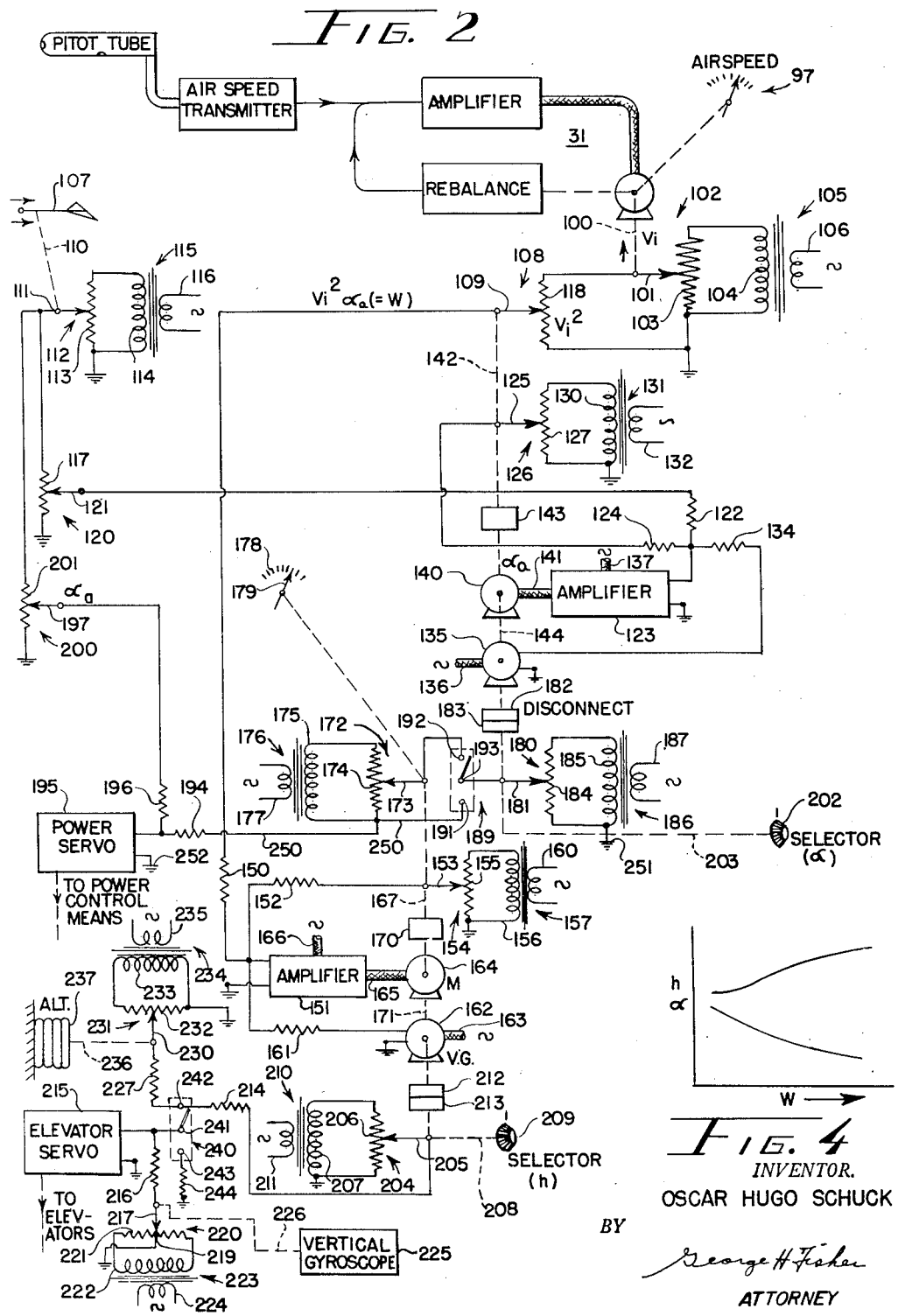
Figure 2 is a wiring diagram showing the inter-relationship among elements making up the structure of Figure 1.
Figure 4 is a diagram illustrative of the theoretical basis on which the invention rests.

The range of a craft is determined not only by the aerodynamic efficiency of the air frame and propeller, and by the mechanical efficiency of the engines, but also by the conditions under which the flight is conducted. Aerodynamic research has disclosed that as the weight of a craft varies, the optimum altitude and the optimum attack angle at which the craft may be flown also vary, and hence for most efficient operation of the craft it should be flown at an altitude and an attack angle which change as consumption of fuel lightens the craft. Figure 4 is illustrative of the general relationship. In this figure $W$ represents the total weight, $h$ the optimum altitude, and $\alpha$ the optimum attack angle. While Figure 4 shows a typical relationship, specific curves must be calculated for each particular combination of air frame, propeller and engine.

The present invention is based on the foregoing aerodynamic principles, and on the further principle that the gross weight $W$ of an aircraft is related to its indicated air speed and to its actual attack angle according to the equation $$W = kV_i^2 \alpha_a \qquad (1)$$

where $\alpha_a$ is the actual attack angle measured from the attack angle for zero lift and $V_i$ is the indicated air speed.

Figure 1:
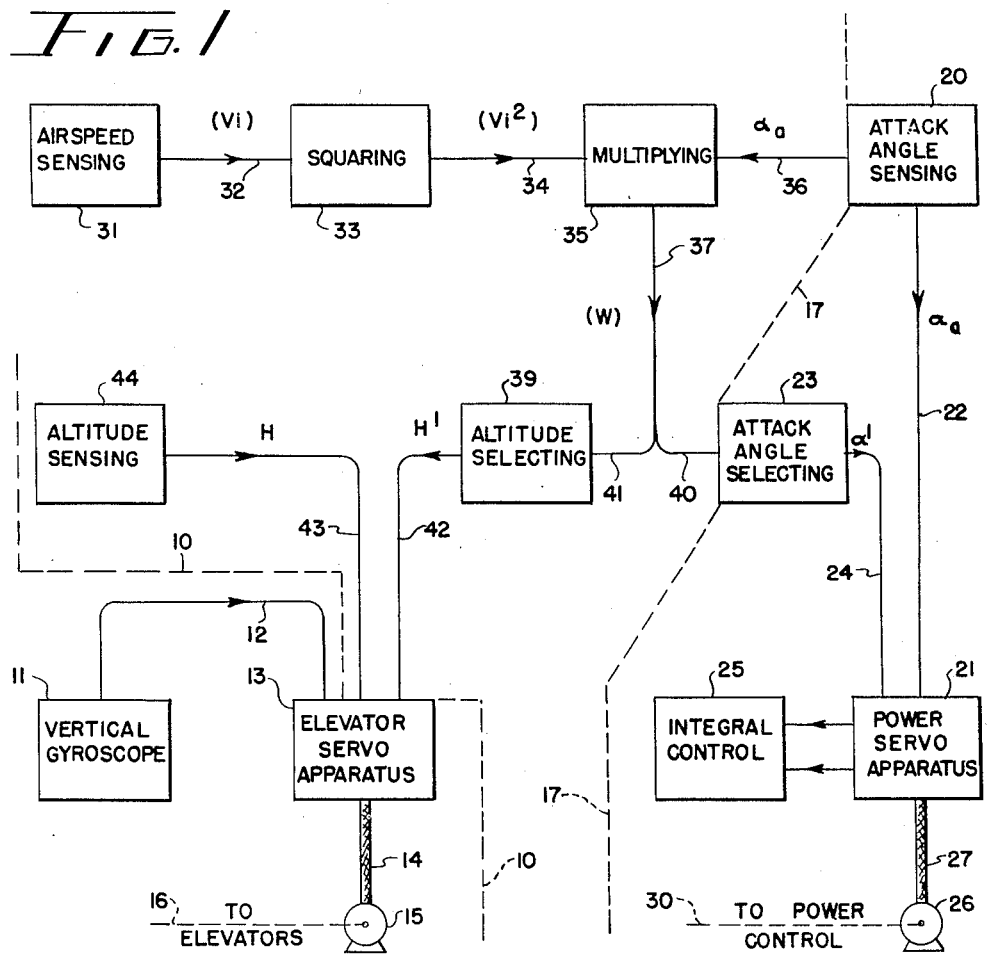
Figure 1 is a schematic showing of a preferred embodiment of the invention.

A generalized showing of a preferred embodiment of the invention is given in Figure 1. In the lower left hand corner of this figure the elevator control channel only of a simplified automatic pilot is shown below and to the left of the dotted line 10 to comprise a vertical gyroscope 11 supplying a control signal through a suitable connection 12 to elevator servo apparatus 13 which may include such further refinements as are considered desirable by the user of the apparatus. Apparatus 13 energizes, through a suitable connecting cable 14, the elevator servomotor 15 of an aircraft, which in turn operates the elevators through a mechanical connection 16.

On the other side of the figure, to the right of dotted line 17, are generally shown the elements of a power stabilizing system for operating the power controls of an aircraft in such a fashion as to maintain its attack angle at a desired value: an attack angle sensing device 20 is shown as supplying a first signal, proportional to $\alpha_a$, to a power servo apparatus 21, through a suitable connection 22. An attack angle selecting device 23 is also shown as supplying, through a suitable connection 24, a second signal proportional to $\alpha'$, the selected attack angle. These two signals are combined in power servo apparatus 21 which may if desired include an integral control arrangement 25, to cause operation of a power control motor 26 through a suitable connection 27. Motor 26 operates, through a suitable mechanical connection 30, to actuate one or more of the power controls of the aircraft.

One form of apparatus suitable for performing the functions just described is disclosed in the copending application of O. H. Schuck and R. C. Alderson, Serial No. 68,238, filed December 30, 1948, and assigned to the assignee of the present application.

In addition to the components just described, the apparatus of Figure 1 is shown to include an airspeed sensing device 31 which supplies, through a suitable connection 32, a signal proportional to the indicated airspeed of the craft. This signal is applied to a squaring apparatus 33, whose output is supplied through suitable means 34 to a multiplier 35. A second signal is supplied by a connection 36 to multiplier 35 from attack angle sensing device 20: the zero of measurement for this signal must be the attack angle of zero lift.

Multiplier 35 supplies at 37 a signal proportional to the magnitude of $V_i^2 \alpha_a$, which as pointed out above is proportional to $W$, the weight of the aircraft. This signal is supplied through a first branch 40 to attack angle selector 23, and through a second branch 41 to an altitude selector 39, which, in turn, supplies at 42 a further input for elevator servo apparatus 13. A still further input 43 for apparatus 13 is supplied by an altitude sensing device 44.

Figure 2 is a wiring diagram showing in more detail the novel features of the apparatus disclosed in Figure 1. Airspeed sensing device 31 is shown to comprise a telemetric transmitter in which a motor positions a shaft 100 in accordance with the response of a pitot tube to the airspeed of the craft. Shaft 100 actuates an airspeed indicator 97 and moves the slider 101 of a voltage divider 102 with respect to its winding 103, which is energized from the secondary winding 104 of a transformer 105 having a primary winding 106. Winding 103 is not linear, but varies in resistance as the square of the distance from the lower end, so that voltage divider 102 performs the function of squaring device 33 of Figure 1. The output from slider 101 is impressed across winding 118 of a voltage divider 108 having a slider 109.

Attack angle sensing device 20 is shown in Figure 2 to comprise a vane 107 mounted for exposure to the relative wind. As the attack angle of the craft varies, vane 107 acts through a suitable mechanical connection 110 to move the slider 111 of a voltage divider 112 having a linear winding 113 energized from the secondary winding 114 of a transformer 115 having a primary winding 116. The output of voltage divider 112 is impressed across the winding 117 of a voltage divider 120 having a slider 121 which is manually adjustable. The output from voltage divider 120 is impressed through a summing resistor 122 on the input of an amplifier 123.

A second input for amplifier 123 is supplied through a summing resistor 124 from the slider 125 of a follow-up voltage divider 126 having a linear winding 127 energized from the secondary winding 130 of a transformer 131 having a primary winding 132.

A still further input to amplifier 123 is supplied through a summing resistor 134 from a "velocity generator" or dynamic transformer 135 energized with alternating voltage from the same source as primaries 106, 116 and 132 through a suitable input cable 136. Velocity generator 135 is a dynamoelectric machine having a normally energized primary winding and a secondary winding arranged in normally non-inductive relation thereto. When a rotor which also comprises a portion of the generator is in motion voltage is induced in the secondary winding from the primary winding, the frequency of the induced voltage being that applied across the primary winding, its amplitude being determined by the speed by which the rotor is being driven, and its phase being determined by the direction in which the rotor is driven. Such arrangements are well known in the art.

In addition to the signal inputs just described, amplifier 123 is supplied with alternating voltage from the same source as primaries 106, 116 and 132 through a connection 137, and energizes a motor 140 through a suitable connection 141. Amplifier 123 is of the type in which a motor control output is provided for causing operation of the motor in one direction or the other according as the sense of the input signal voltage is the same as or opposite to the sense of the voltage applied on connection 137: such amplifiers are also well known in the art.

Motor 140 drives slider 109 of voltage divider 108 and slider 125 of voltage divider 126 through a mechanical connection 142 which may include suitable reduction gearing 143. Motor 140 also is connected to drive velocity generator 135 directly through a mechanical connection 144.

The voltage between slider 109 and ground is impressed through a summing resistor 150 on the input to a second amplifier 151 resembling amplifier 123 in every respect. A second input to amplifier 151 is provided through a summing resistor 152 from the slider 153 of a follow-up voltage divider 154 having a winding 155 energized from the secondary winding 156 of a transformer 157 having a primary winding 160.

A further input to amplifier 151 is provided through a summing resistor 161 from a velocity generator 162 which is like velocity generator 135, and which has an input or power connection 163. Amplifier 151 energizes a motor 164 through a suitable electrical connection 165 and is energized with alternating voltage through a suitable electrical connection 166. Motor 164 drives slider 153 through a suitable mechanical connection 167 which may include reduction gearing 170, and also drives velocity generator 162 through a mechanical connection 171.

In the center of Figure 2 there is shown a voltage divider 172 having a slider 173, driven by motor 164 through mechanical connection 167, and a "characterized" or non-linear winding 174 energized from the secondary winding 175 of a transformer 176 having a primary winding 177. Connection 167 is extended to move the index 179 of an altitude indicator with respect to its scale 178. There is also shown a further voltage divider 180 having a slider 181 driven by motor 140 through a mechanical connection including reduction gearing 182 and a disconnect arrangement 183, and a winding 184 energized by the secondary winding 185 of a transformer 186 having a primary winding 187. This portion of the circuit also includes a single pole double throw switch 189 comprising a pair of fixed contacts 191 and 192 and a switching contact 193.

Electrical energy is supplied from the voltage dividers just described through a summing resistor 194 to power servo 195, which includes elements 21, 25, 26, and 27 of Figure 1. A further input to servo 195 is supplied through a summing resistor 196 from the manually adjustable slider 197 of a voltage divider 200 having a winding 201 energized from slider 111 of voltage divider 112.

Slider 181 is movable with respect to winding 184, independently of operation of motor 140, by a manual knob 202 connected to slider 181 by a suitable mechanical connection 203.

Near the bottom of Figure 2 there is shown a voltage divider 204, having a slider 205 movable with respect to a characterized or non-linear winding 206 energized from the secondary winding 207 of a transformer 210 having a primary winding 211. Slider 205 is arranged to be driven by motor 164 through suitable reduction gearing 212 and a disconnect arrangement 213, and also, through a mechanical connection 208, by a manual knob 209. The output of voltage divider 204 is supplied through a summing resistor 214 and a switch 240 to elevator servo 215, which comprises members 13—15 inclusive of Figure 1. Switch 240 includes a switching contact 241 and a pair of fixed contacts 242 and 243, the latter being grounded through a resistor 244.

A further input to elevator servo 215 is supplied through a summing resistor 216 from the slider 217 of a voltage divider 220 the linear winding 221 of which is energized from the secondary winding 222 of a transformer 223 having a primary winding 224. Slider 217 is moved with respect to winding 221 by vertical gyroscope 225, through a suitable mechanical connection 226. Winding 221 is provided with a center tap 219 which is connected to ground.

A further input to servo 215 is provided, through a summing resistor 227, from the slider 230 of a voltage divider 231, the linear winding 232 of which is energized from the secondary winding 233 of a transformer 234 having a primary winding 235. Slider 230 is moved with respect to winding 232, through a mechanical connection 236, by an altitude responsive bellows 237.

It will be appreciated that the primary windings of transformers 105, 115, 131, 157, 176, 186, 210, 223, and 234, and of velocity generators 135 and 162, as well as amplifiers 123 and 151, are all energized from a common source of alternating voltage of a selected frequency, so that the phase relationship between all the voltages supplied as inputs to the various amplifiers and servos is fixed.

*Operation*

In describing the operation of the apparatus, it will be first assumed that it is mounted in an aircraft in flight, that switches 189 and 240 are closed downwardly, that disconnect devices 183 and 213 have operated to disconnect sliders 181 and 205 from motors 140 and 164, that power servo 195 and elevator servo 215 are energized, that vertical gyroscope 225 is in operation at its proper speed, that the heaters of amplifiers 123 and 151 have reached a stable condition, but that there is no other power applied to these amplifiers, and that the components making up airspeed sensing unit 31 are properly energized. Under these conditions slider 101 is positioned in accordance with the airspeed of the craft, moving upwardly along its winding as the airspeed increases, and slider 112 is positioned in accordance with the attack angle of the craft, moving upwardly as the attack angle increases.

Slider 230 is positioned by bellows 237 in accordance with the pressure altitude of the craft, moving to the right along winding 232 as the altitude increases. Slider 217 is moved in accordance with the pitch attitude of the craft by vertical gyroscope 225, being at the center of winding 221 when the craft is level. Since the craft is subject to pitching in either direction, through a considerable range of angular movement, it has been found preferable to use the center of this winding rather than one end of the winding as the comparison point, and to this end, center tap 219 is provided.

Under the conditions just defined, the only signal shown in Figure 2 for elevator servo 215 is from vertical gyroscope 225. It is conventional in elevator servo systems, however, to provide a rebalancing signal operated by the elevator servomotor, and one or more further signals having the effect of selecting a pitch attitude of the craft which it is desired to stabilize. If the attitude of the craft is that which is selected, the signal from slider 217 is proper in sense and magnitude to neutralize all other signals to elevator servo 215, and no operation of the elevators takes place. Under any other conditions, operation of the elevators takes place to change the pitch attitude of the craft, as indicated by vertical gyroscope 225, until it is that selected.

Simultaneous with this energization of elevator servo 215, power servo 195 is being supplied with two signals, the first being derived from slider 111 through summing resistor 196, and hence being proportional to the actual attack angle of the craft. The second signal to the power servo is supplied through a circuit which may be traced from summing resistor 194 through a conductor 250, fixed contact 191 and switching contact 193 of switch 189, slider 181 and the lower portion of winding 184 of voltage divider 180, to ground connection 251. This second signal is determined by the position of slider 181, which in turn may be set to any desired value by manual operation of selector knob 202. Thus whenever the actual attack angle of the craft is not that selected, power servo 195 is energized, operating the power control means of the craft to increase or decrease the available thrust and hence the actual attack angle.

If it is desired to have altitude control of the aircraft the human pilot closes switch 240 in its upward direction, thus adding two further voltages to the input of elevator servo 215. The first of these voltages is that supplied from slider 230, which varies with the actual pressure altitude of the craft. The second additional voltage is that provided from slider 205, which may be manually operated to select a desired altitude for the craft. When the signals from sliders 230 and 205 are equal and opposite, which occurs when the craft is actually at the altitude selected, no further signal for elevator servo 215 is supplied to switch 240: in all other cases elevator servo 215 is energized for operation in one sense or the other, changing the elevator settings until the craft has attained the desired altitude, after which the elevators are returned to their previous positions. Thereafter either change in the pitch attitude of the craft or change in the altitude of the craft, whether due to gusts of wind, consumption of fuel, or movement of occupants of the craft with respect to its center of gravity, results in operation of elevator servo 215 in such a fashion as to maintain the craft in the desired pitch attitude at the desired altitude.

When it is desired to control the flight of the craft to obtain maximum range of operation, the energizing circuits for amplifiers 123 and 151 and velocity generators 135 and 162 are completed in any suitable fashion, switch 189 is closed upwardly, and slider 197 is moved to the bottom of winding 201. If slider 125 is at such a position on winding 127 that the voltage supplied to amplifier 123 from this source is equal and opposite to the voltage supplied from slider 112, the input to the amplifier is zero and operation of motor 140 does not take place. For any other condition, a residual voltage is impressed on amplifier 123, and motor 140 operates to adjust slider 125 until this condition is reached. The signal from velocity generator 135 simply gives the circuit antihunt properties. Slider 109 is adjusted simultaneously with slider 125, and when motor 140 comes to rest, slider 109 has been adjusted in accordance with the value of the actual attack angle as sensed by vane 107. This means that shaft 144 of motor 140 is in the same position it would have taken if there had been a direct connection between that shaft and manual selector 202 when the latter was originally set, so that disconnect device 183 can now be actuated to connect the shaft to the slider.

As previously pointed out, the voltage between the lower terminal of winding 103 and slider 101 varies as the square of the displacement of the slider, within practical limits. This means that there is impressed across winding 118 a voltage proportional to the square of the indicated airspeed, and of this voltage a portion determined by $\alpha_a$, the attack angle of the craft, appears between slider 109 and ground. This voltage has the value $kV_i^2\alpha_a$, which has been shown to equal W, the gross weight of the craft, and is impressed on the input of amplifier 151. If slider 153 is at such a position on winding 155 that the voltage supplied therefrom is equal and opposite to the voltage supplied through summing resistor 150, no resulting input is supplied to amplifier 151 and motor 164 does not operate. For any other position of slider 153, a residual signal is impressed on amplifier 151, and motor 164 operates to adjust the position of slider 153 until the condition of equality is again restored. The signal from velocity generator 162 merely gives antihunt properties.

When the motor 164 stops running, the position of its shaft is a measure of the optimum altitude for the craft under its present load. This altitude can be read on scale 178. The graduations on scale 178 are not linear, but are characterized in the same fashion as winding 206 of voltage divider 204. The human pilot now adjusts manual altitude selector 209 until the altitude selected is the same as that indicated by index 178. When the craft has reached the selected altitude, as indicated by the craft's altimeter or any other suitable instrument, disconnect 213 can be operated to complete the connection between slider 205 and motor 164. The apparatus is now in full operation.

As fuel is consumed, the craft becomes lighter and tends to rise. This tendency is sensed by bellows 237 as a change in altitude, and by vane 107 as a change in attack angle, and the elevators and power controls of the craft are adjusted to maintain these variables in their former values. In the elevator channel, this is done at the expense of pitch attitude. The attack angle being maintained by that selected heading, the change in pitch attitude is accompanied by a change in airspeed, which is sensed by sensing device 31 resulting in a change in the position of slider 101. This in turn changes the voltage impressed through summing resistor 150 on amplifier 151, and motor 164 is energized to adjust the position of slider 153 until the voltage from this source has taken a new value which is just sufficient to neutralize the voltage from slider 109. When this condition is reached, motor 164 again stops.

This operation of motor 164 changes the position of slider 173 with respect to winding 174, thus changing the voltage supplied through summing resistor 194 to power servo 195, and in effect changing the selected value of attack angle. Power servo 195 operates to change the power settings of the craft until it has achieved the new selected attack angle as sensed by vane 107.

Operation of motor 164 simultaneously adjusts the position of slider 205 with respect to winding 206, thus changing the voltage supply to elevator servo 215 through summing resistor 214. This in effect amounts to selecting a new altitude at which the aircraft is to be flown, and elevator servo 215 adjusts the elevators in such a fashion that the craft is brought to and maintained at the new selected altitude.

Figure 3:
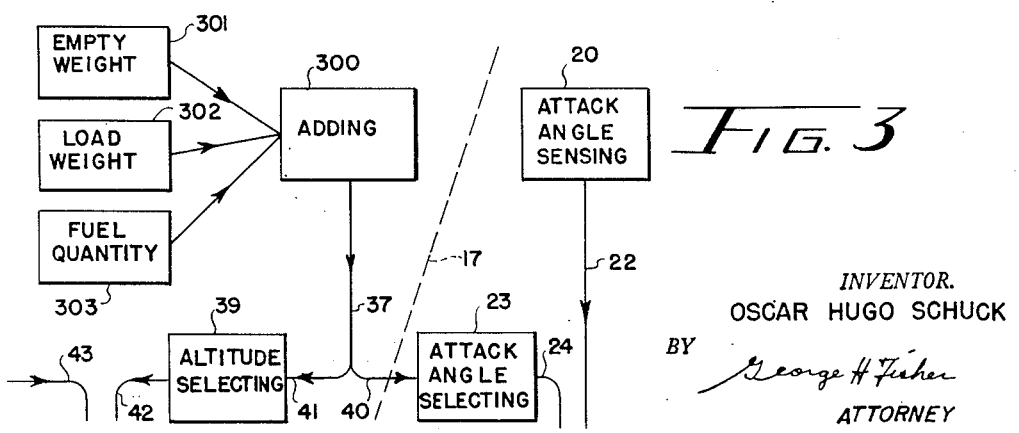
Figure 3 is a fragmentary showing of a modification of the apparatus of Figure 1.

Although Figures 1 and 3 illustrate the most perfect form of the invention, considerable simplification may be brought about without excessive loss of accuracy if the apparatus is modified as taught in Figure 3. This figure is fragmentary, illustrating specifically only those details in which the modified apparatus differs from that previously described. It will be seen that the inputs 40 and 41 to attack angle selector 23 and altitude selector 39 are provided in this modification from an adding mechanism 300, which in turn has three inputs. The first input is adjustable in accordance with the empty weight of the craft and is indicated by the reference numeral 301. The second input is adjustable in accordance with the load of the craft, which includes personnel, armament, and cargo, and is indicated by the reference numeral 302. The third input is continuously variable in accordance with the amount of fuel presently in the tanks of the aircraft, and is represented by reference numeral 303. It is apparent that for ordinary commercial flights, the only change which can take place in the weight of the craft between take-off and landing is due to the consumption of fuel, and therefore this is the only quantity which needs to be continuously variable. If the apparatus is installed in military aircraft, suitable means may be provided for adjusting the load weight input 302 each time a bomb or other object is discharged from the craft.

Apparatus for continuously indicating the amount of fuel in the tanks of an aircraft is well known in the art, and any suitable arrangement for this purpose may be used. One such arrangement is illustrated in the copending application of Morley et al. Serial No. 575,168, now Patent No. 2,563,280 filed January 29, 1945, and assigned to the assignee of the present application.

With the exception of the operation of the apparatus for determining the value of W, the embodiment of the device illustrated in Figure 3 operates in exactly the same fashion as that illustrated in Figures 1 and 2, and this description will not be repeated.

Numerous objects and advantages of the invention have been set forth in the foregoing description, together with details of the structure and function of the invention, and the novel features are pointed out in the appending claims. The disclosure, however, is illustrative only, and changes may be made in detail, especially in matters

I claim as my invention:

1. Apparatus of the class described comprising, in combination: first adjustable means for controlling the pitch attitude of an aircraft; second adjustable means for controlling the attack angle of the aircraft; further means for giving an output determined by the gross weight of the aircraft; means connecting said further means to said first adjustable means to cause adjustment thereof to an extent determined by said output; and means connecting said further means to said second adjustable means to cause adjustment thereof in accordance with said output.

2. Apparatus of the class described comprising, in combination: means including an adjustable altitude selector and an altitude sensor for controlling the pitch attitude of an aircraft to cause it to move at a selected altitude; means including an adjustable attack angle selector and an attack angle sensor for controlling the effective power of the aircraft to cause it to move at a selected attack angle; further means for giving an output determined by the gross weight of the aircraft; and means connecting said further means to each of said selectors to cause adjustment thereof to an extent determined by said gross weight output, so as to cause the movement of the craft to take place at an altitude and attack angle which vary with the weight of the craft.

3. Apparatus of the class described comprising, in combination: a first voltage divider having a characterized winding determined by the relation between the gross weight of an aircraft and its optimum altitude; a second voltage divider having a characterized winding determined by the relation between the gross weight of the aircraft and its optimum attack angle; means energizing each of said voltage dividers with alternating voltage of fixed amplitude; means connected to said voltage dividers for simultaneously adjusting said voltage dividers to an extent determined by the gross weight of the aircraft; and means energized from said voltage dividers for controlling the pitch attitude and effective power of the aircraft.

4. Apparatus of the class described comprising, in combination: a first voltage divider having a characterized winding determined by the relation between the gross weight of an aircraft and its optimum altitude; a second voltage divider having a characterized winding determined by the relation between the gross weight of the aircraft and its optimum attack angle; means energizing each of said voltage dividers with alternating voltage of fixed amplitude; further means connected to said voltage dividers for simultaneously adjusting each of said voltage dividers to an extent determined by the gross weight of the aircraft; means for normally stabilizing the pitch attitude and effective power of the aircraft; and means connected to said stabilizing means and energized from said voltage dividers for modifying the operation of said stabilizing means.

5. Apparatus of the class described comprising, in combination: a first voltage divider having a characterized winding determined by the relation between the gross weight of an aircraft and its optimum altitude; a second voltage divider having a characterized winding deter- mined by the relation between the gross weight of the aircraft and its optimum attack angle; means energizing each of said voltage dividers with alternating voltage of fixed amplitude; further means connected to said voltage dividers for simultaneously adjusting each of said voltage dividers to an extent determined by the gross weight of the aircraft; pitch attitude control means, including one of said voltage dividers, for causing the aircraft to proceed at a selected altitude; and effective power control means, including one of said voltage dividers, for causing the aircraft to proceed at a selected attack angle.

6. Apparatus of the class described comprising, in combination: a first voltage divider having a characterized winding determined by the relation between the gross weight of an aircraft and its optimum altitude; a second voltage divider having a characterized winding determined by the relation between the gross weight of the aircraft and its optimum attack angle; means energizing each of said voltage dividers with alternating voltage of fixed amplitude; airspeed responsive means for giving a first output determined by the airspeed of the aircraft; attack angle means for giving a second output determined by the attack angle of the aircraft; computing means connected to said responsive means and said voltage dividers, and energized with said outputs to adjust each of said voltage dividers to an extent determined by a function of said outputs; and means including said voltage dividers for controlling the pitch attitude and effective power of the aircraft.

7. Apparatus of the class described comprising, in combination: a first voltage divider having a characterized winding determined by the relation between the gross weight of an aircraft and its optimum altitude; a second voltage divider having a characterized winding determined by the relation between the gross weight of the aircraft and its optimum attack angle; means energizing each of said voltage dividers with alternating voltage of fixed amplitude; means giving a first output in accordance with the airspeed of the craft; means giving a second output in accordance with the attack angle of the craft; computing means energized with said outputs to adjust said voltage dividers in accordance with the product of said second output multiplied by the square of said first output; and means including said voltage dividers for controlling the pitch attitude and effective power of the aircraft.

8. Apparatus of the class described comprising, in combination: a first voltage divider having a characterized winding determined by the relation between the gross weight of an aircraft and its optimum altitude; a second voltage divider having a characterized winding determined by the relation between the gross weight of the aircraft and its optimum attack angle; means energizing each of said voltage dividers with alternating voltage of fixed amplitude; means adjustable to give a first output determined by the fixed weight of the craft; means giving a second output which varies with the variable weight of the craft; computing means connected to said two last named means and said voltage dividers and energized with said outputs to adjust each of said voltage dividers to an extent determined by said outputs; and means including said voltage dividers for controlling the pitch attitude and effective power of the craft.

9. Apparatus of the class described comprising, in combination: means including an altitude selector and an altitude sensor for controlling the pitch attitude of an aircraft; means including an attack angle selector and an attack angle sensor for controlling the effective power of the aircraft; an airspeed sensor; and means connected to said selectors and including said airspeed sensor and said attack angle sensor, for concurrently operating each of said selectors to an extent determined by a function of the airspeed and attack angle of the aircraft.

10. Apparatus of the class described comprising, in combination: means for giving a first output determined by the square of the airspeed of a moveable aircraft; means for giving a second output determined by the actual attack angle of the craft; means connected to said above named means for deriving from said outputs a signal determined by the product thereof; and means connected to said last named means for adjusting the altitude and attack angle of the craft in accordance with said signal.

11. Apparatus of the class described comprising, in combination: means adjustable to an extent determined by the fixed load of an aircraft; means variable with the variable load of the aircraft; computing means connected to said adjustable means and said variable means and actuated jointly thereby to derive an output determined by the gross weight of the aircraft, and means connected to said last named means for adjusting the altitude and attack angle of the aircraft in accordance with said output.

References Cited in the file of this patent

UNITED STATES PATENTS

| | | |
|---|---|---|
| 2,443,098 | Dean | June 8, 1948 |
| 2,516,142 | Nissen | July 25, 1950 |
| 2,532,936 | Peterson | Dec. 5, 1950 |
| 2,553,983 | Saxman, Jr. | May 22, 1951 |
| 2,626,103 | Serrell et al. | Jan. 20, 1953 |

OTHER REFERENCES

"Flight Engineering and Cruise Control," Harris G. Moe, Wiley & Sons, Inc.; 1947; pp. 133–144.